United States Patent
Zlatarev

(10) Patent No.: US 10,873,611 B2
(45) Date of Patent: Dec. 22, 2020

(54) VIRTUAL DIGITAL MEETING SYSTEM

(71) Applicant: SAP SE, Walldorf (DE)

(72) Inventor: Stephan Zlatarev, Sofia (BG)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/979,836

(22) Filed: May 15, 2018

(65) Prior Publication Data

US 2019/0356709 A1  Nov. 21, 2019

(51) Int. Cl.
*G06F 3/048* (2013.01)
*H04L 29/06* (2006.01)
*G06F 3/0481* (2013.01)
*H04L 29/08* (2006.01)

(52) U.S. Cl.
CPC .......... *H04L 65/403* (2013.01); *G06F 3/0481* (2013.01); *H04L 67/306* (2013.01)

(58) Field of Classification Search
CPC ..... H04L 12/16; H04L 65/403; H04L 67/306; G06F 3/0481
See application file for complete search history.

(56) References Cited

U.S. PATENT DOCUMENTS

| | | | | |
|---|---|---|---|---|
| 8,600,794 B2 * | 12/2013 | Blair | .......... | G06Q 10/1095 705/7.18 |
| 2004/0008635 A1 * | 1/2004 | Nelson | .......... | H04N 7/152 370/260 |
| 2011/0149811 A1 * | 6/2011 | Narayanaswamy | .......... | H04L 12/1818 370/261 |
| 2012/0179502 A1 * | 7/2012 | Farooq | .......... | H04L 12/1818 705/7.13 |
| 2012/0204120 A1 * | 8/2012 | Lefar | .......... | G06Q 10/0631 715/757 |
| 2013/0091205 A1 * | 4/2013 | Kotler | .......... | H04L 65/403 709/204 |
| 2014/0006974 A1 * | 1/2014 | Bell | .......... | H04L 65/403 715/753 |
| 2016/0269504 A1 * | 9/2016 | Johar | .......... | H04L 67/141 |
| 2018/0145840 A1 * | 5/2018 | Advani | .......... | H04L 12/1822 |
| 2018/0158023 A1 * | 6/2018 | Soni | .......... | G06F 21/60 |
| 2018/0176268 A1 * | 6/2018 | Malatesha | .......... | H04L 67/42 |
| 2018/0302233 A1 * | 10/2018 | Viera | .......... | H04L 12/1818 |

* cited by examiner

Primary Examiner — Mahelet Shiberou
(74) Attorney, Agent, or Firm — Schwegman Lundberg & Woessner, P.A.

(57) ABSTRACT

Systems and methods are provided for generating a meeting display comprising an indicator for each participant for a meeting, at least a first dashboard, and an event log and causing the meeting display to be displayed on each computing device associated with each participant for the meeting. The systems and methods further providing for generating events based on each computing device interaction with the meeting display and interactions between one or more computing devices via the meeting display, and causing events to be displayed as part of the meeting display on each computing device associated with each participant for the meeting.

20 Claims, 12 Drawing Sheets

VIRTUAL DIGITAL MEETING SYSTEM

BACKGROUND

Conference calls allow participants to dial-in to a conference phone number to be connected to an audio or video conference. Additionally, there exists technology for real-time dashboarding to allow people to communicate and view dashboards related to a meeting. There are shortfalls to such technology, however. In one example, current technology does not allow for generating data about the participants (such as involvement in a project), methods for tracking issues and communication, and the like.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a virtual digital meeting system that allows events associated with meeting progress and participants to be generated, stored, and viewed. Example embodiments provide a virtual digital meeting system to allow participant communications, progress, status, and the like in the virtual digital meeting to be monitored and status displayed in a meeting display for the virtual digital meeting. In this way, the virtual digital meeting system generates events automatically based on participant communications and interactions in the meetings and can allow other participants to view and interact with other participants for these events.

For example, example embodiments provide for receiving, by a server computer, a request to initiate a new meeting, and generating, by the server computer, a new meeting profile comprising a list of participants for the meeting, meeting data requested for at least a first dashboard, and an event log for the meeting identifying events occurring during the meeting. The server computer further generates a meeting display comprising an indicator for each participant for the meeting, the first dashboard, and the event log and causes the meeting display to be displayed on each computing device associated with each participant for the meeting. The server computer further generates events based on each computing device interaction with the meeting display and interactions between one or more computing devices via the meeting display, and causes events to be displayed as part of the meeting display on each computing device associated with each participant for the meeting. In one example, the server computer detects communication between one or more computing devices via the meeting display, causes an indication of the communication between the one or more computing devices to be displayed as part of the meeting display, and generates a graphical user interface item on the meeting display to enable other computing devices to join the communication between the one or more computing devices separately from the meeting display.

Figure 1:
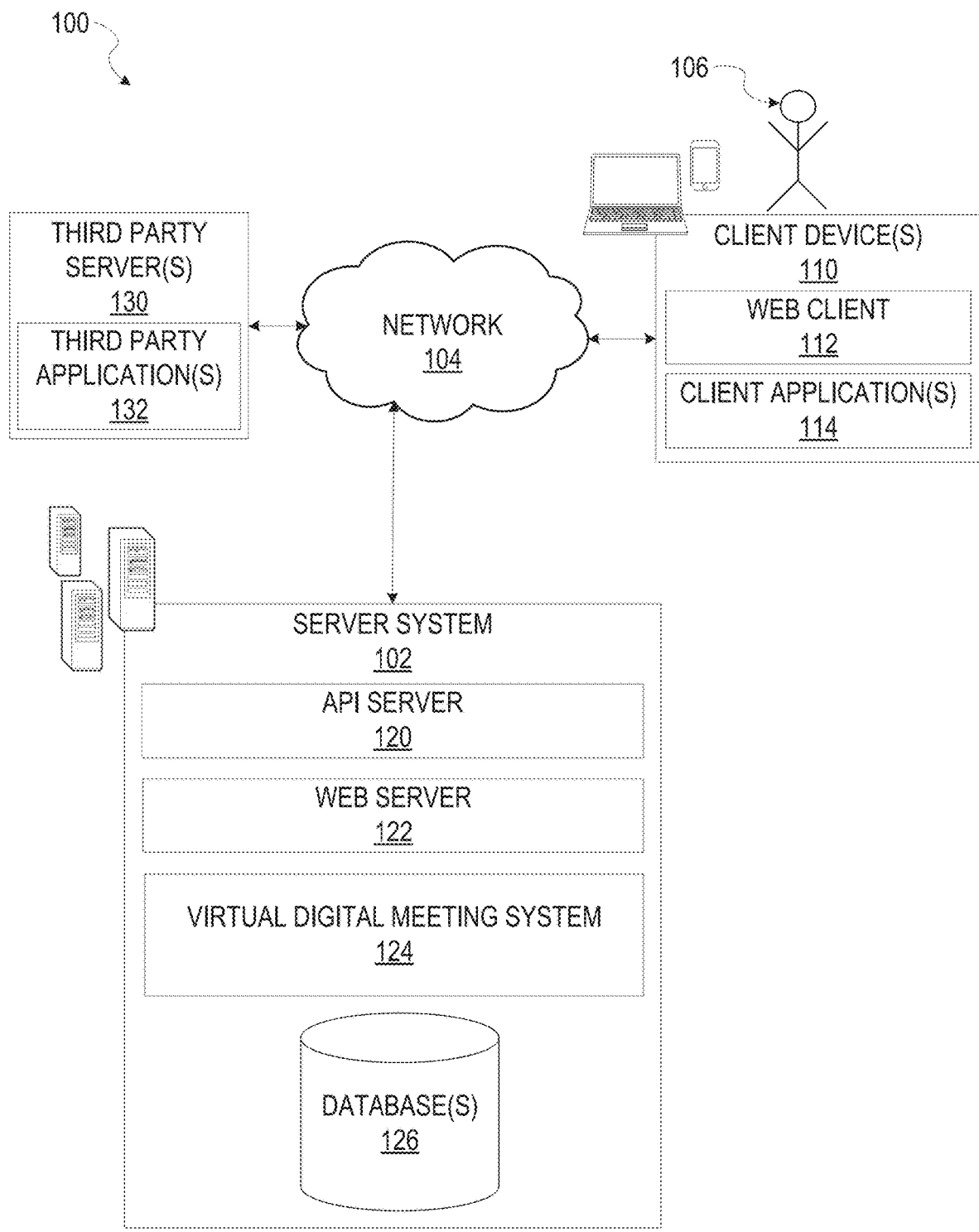
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultra-book, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to participate in a virtual digital meeting, request and receive information related to the virtual digital meeting, display a meeting display for the meeting, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a security-relevant code detection system application, and the like.

In some embodiments, one or more client applications 114 may be included in a given one of the client device 110, and configured to locally provide the user interface and at least some of the functionalities, with the client application 114 configured to communicate with other entities in the system 100 (e.g., third-party servers 130, server system 102, etc.), on an as-needed basis, for data and/or processing capabilities not locally available (e.g., access location information, access software version information, to generate results of security-relevant code detection, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and virtual digital meeting system 124, that may be communicatively coupled with one or more databases 126.

The one or more databases 126 may be storage devices that store data related to one or more virtual digital meetings, including meeting profiles, participant profiles, data for one or more dashboards, and so forth. The one or more databases 126 may further store information related to third-party servers 130, third-party applications 132, client devices 110, client applications 114, users 106, and so forth. The one or more databases 126 may be cloud-based storage.

The server system 102 may be a cloud computing environment, according to some example embodiments. The server system 102, and any servers associated with the server system 102, may be associated with a cloud-based application, in one example embodiment.

The virtual digital meeting system 124 may provide back-end support for third-party applications 132 and client applications 114, which may include cloud-based applications. The virtual digital meeting system 124 may process requests for virtual digital meetings, generate and provide meeting displays, generate meeting profiles and participant profiles, generate events related to virtual digital meetings, and so forth as described in further detail below. The virtual digital meeting system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide virtual digital meeting functionality that is supported by relevant functionality and data in the server system 102. In another example, the third-party website or application may provide data related to a virtual digital meeting.

Figure 2:
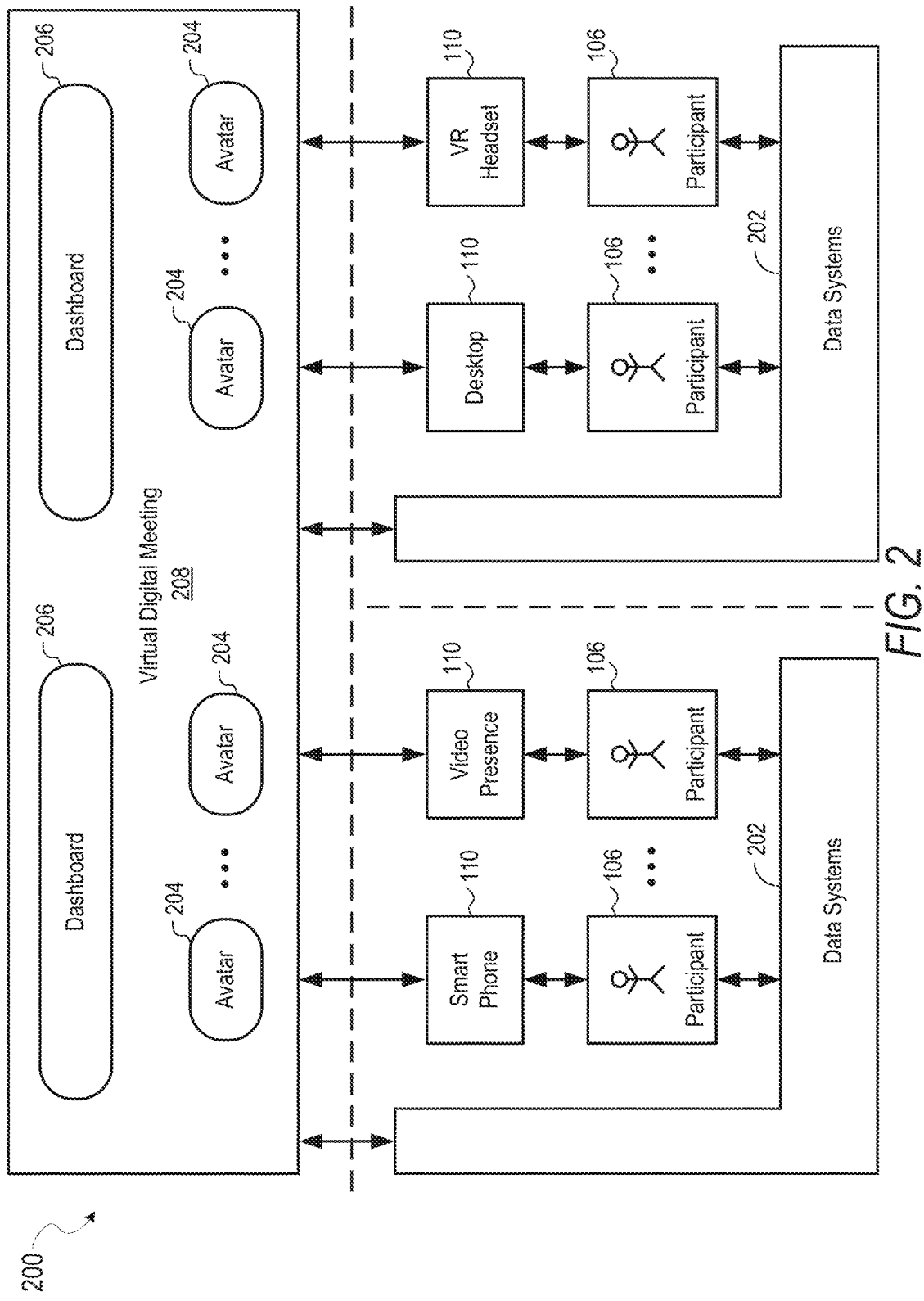
FIG. 2 is a block diagram illustrating an example virtual digital meeting environment, according to some example embodiments.

FIG. 2 is a block diagram illustrating an example virtual digital meeting environment 200, according to some example embodiments. For a given virtual digital meeting, a graphical user interface (e.g., a meeting display) for the virtual digital meeting 208 may be generated and displayed on one or more client devices 110 associated with one or more participants (e.g., users 106). The participants may be represented in the virtual digital meeting 208 via an avatar 204 or other representation. The meeting display may further comprise one or more dashboards 206. Further, the virtual digital meeting environment 200 may interact with one or more data systems 202 (e.g., server system 102, virtual digital meeting system 124, third-party servers 130, and so forth). Further details about the meeting display and events generating during the virtual digital meeting are discussed below.

Figure 3:
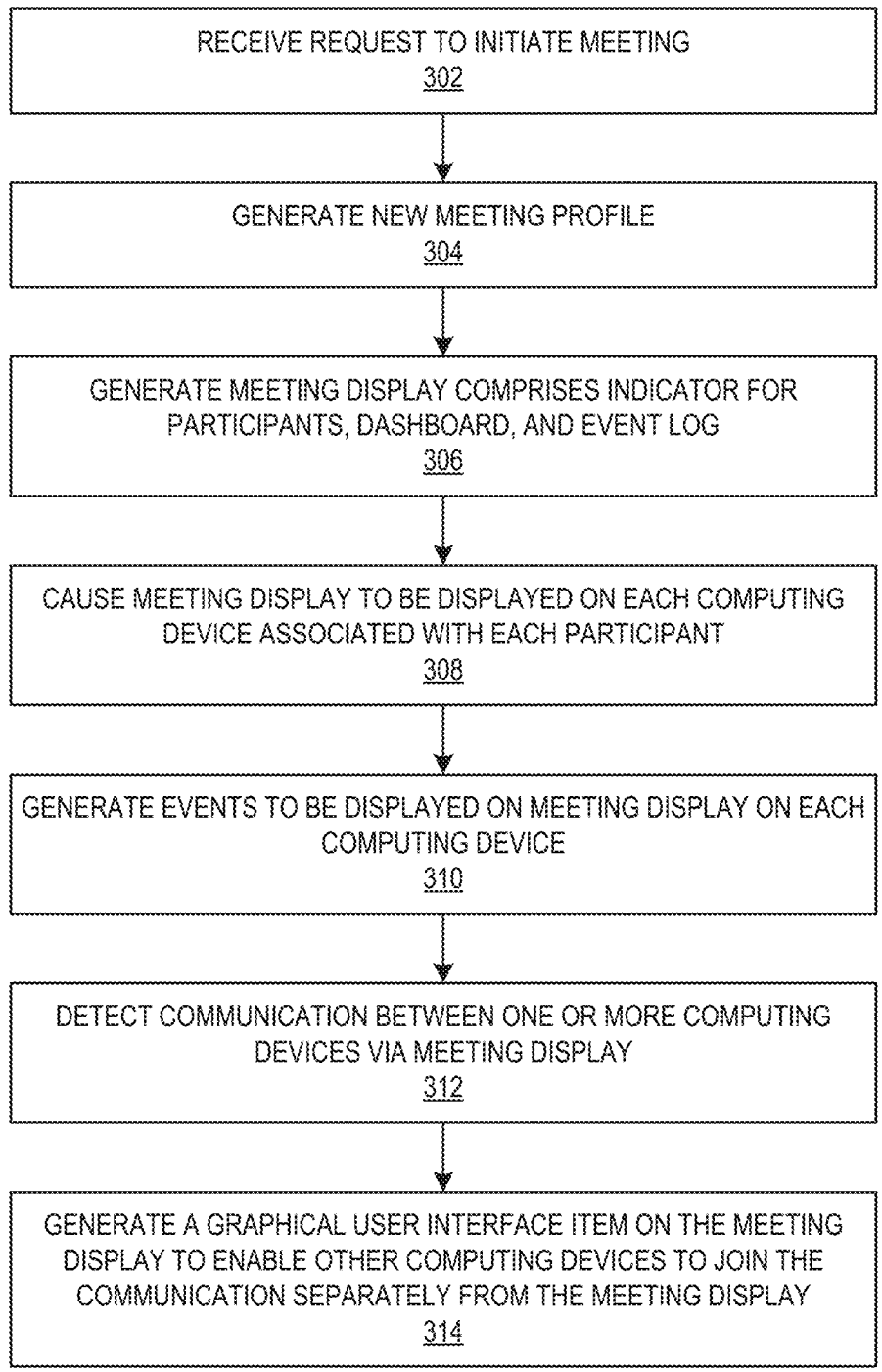
FIG. 3 is a flowchart illustrating aspects of a method, according to some example embodiments.

FIG. 3 is a flow chart illustrating aspects of a method 300 for implementing a virtual digital meeting, according to some example embodiments. For illustrative purposes, method 300 is described with respect to the networked system 100 of FIG. 1. It is to be understood that method 300 may be practiced with other system configurations in other embodiments.

In operation 302, a virtual digital meeting system 124 (e.g., a server computer or other computing device associated with virtual digital meeting system 124) receives a request to initiate a new meeting. For example, the virtual digital meeting system 124 may receive a request from a client device 110 to initiate a meeting. In one example scenario, the meeting may be a "bridge call" for a disruption of the availability of "Application W." A first user may be the host of the virtual digital meeting and a second user may be a representative of Application W. The first user may determine that the disruption was caused by "Service XYZ" and thus may invite a third user associated with Service XYZ to assist on the issue. In one example embodiment a participant may be designated as a moderator for the virtual digital meeting and be the only one to be able to arrange the layout of a meeting display for the virtual digital meeting. In another example embodiment, any participant may determine the layout for data presented in the virtual digital meeting.

Accordingly, the request to initiate the new meeting may comprise a list of participants for the meeting (which may be altered during the course of the virtual meeting) and meeting data requested (e.g., to generate a dashboard display with information about the topic of the meeting or related issues), among other data. In operation 304, the virtual digital meeting system 124 generates a new meeting profile for the virtual digital meeting. The new meeting profile may comprise a list of participants for the meeting, meeting data requested for at least a first dashboard, an event log for the meeting to identify events occurring during the meeting, a summary of the meeting, a list of issues or agenda items to be addressed in the meeting, and so forth. An event log may be used to identify, store, and display events occurring during the meeting. Some examples of events may include communication between one or more computing devices, action items or tasks identified in the meeting, updated status of action items, a new or modified dashboard, a status update or project update, and so forth.

The virtual digital meeting system 124 may further generate a participant profile for each participant. The participant profile may comprise a unique identifier for the participant profile, a participant name, a participant location, a participant title, a participant role in meeting, action items (e.g., assigned tasks) or events associated with the participant, an organization associated with the participant, an avatar representing the participant, an image representing the participant, progress on actions (e.g., tasks) or events associated with the participant, and so forth. The virtual digital meeting system 124 may further determine position and orientation to display data related to a participant in a meeting display and related to a dashboard or other data to display in a meeting display. This may be based on default settings or on participant requested settings.

Figure 4:
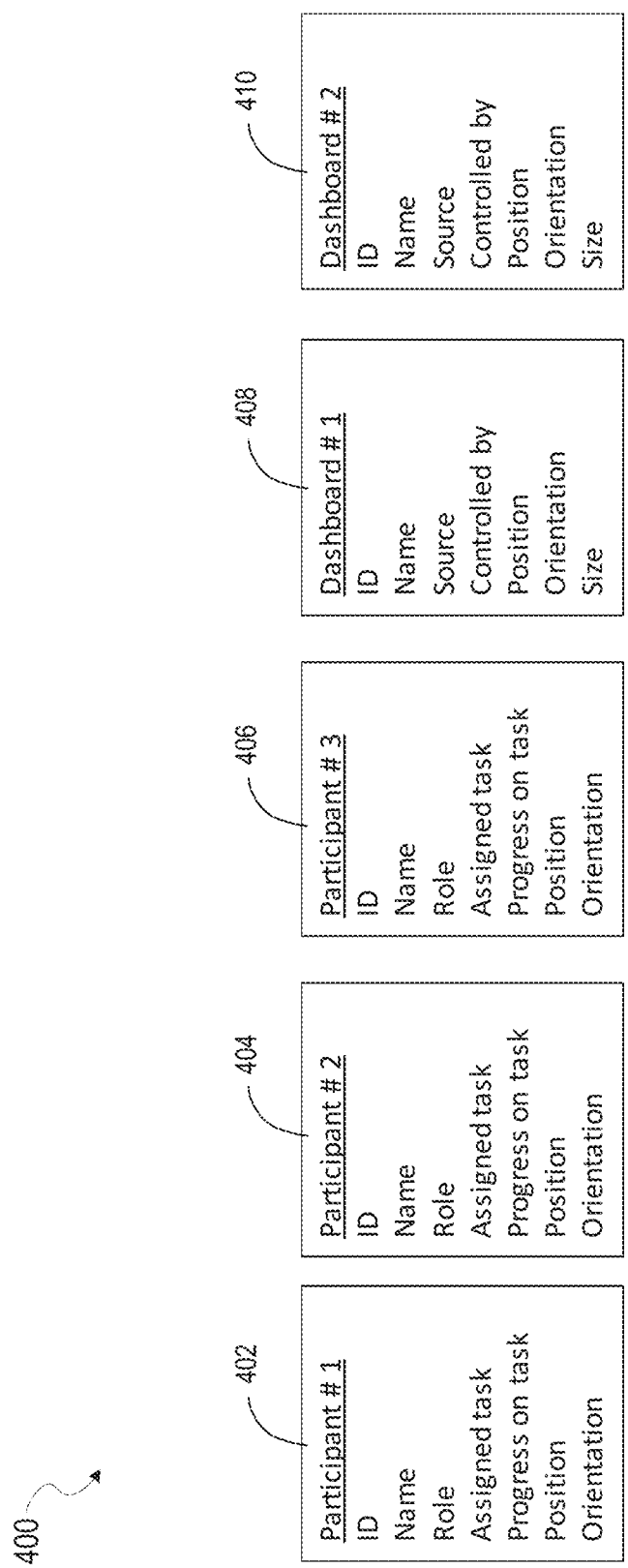
FIG. 4 shows an example of data related to a virtual digital meeting, according to some example embodiments.

In the example used above for disruption of the availability of Application W, the virtual digital meeting system 124 may thus generate and maintain data for the virtual digital meeting with five entities, as shown in FIG. 4. FIG. 4 shows an example of data 400 that may be stored for three participants 402, 404, and 406 (e.g., the first user, the second user, and the third user), and two dashboards 408 and 410 to be displayed in the meeting display. Each of the five entities may correspond to a separate display item in a meeting display. The data 400 shown in FIG. 4 is just an example; more, less, or different data may be stored for a virtual digital meeting.

Returning to FIG. 3, in operation 306, the virtual digital meeting system 124 generates a meeting display for the virtual digital meeting. In one example, the meeting display is a graphical user interface comprising various display items associated with the meeting. For example, the meeting display may comprise an indicator (e.g., name, image, avatar, or the like) for each participant in the meeting, at least one dashboard comprising data related to the meeting, an event log displaying events occurring during the meeting, a brief description or summary of the intent of the meeting or with updates on status of the meeting, a list of issues, status information about each issue, and so forth. The meeting display may be updated in real time (or near real time) as new events occur during the meeting and as new events or data that effect the meeting or issues in the meeting occur outside of the meeting.

In operation 308, the virtual digital meeting system 124 causes the meeting display to be displayed on a computing device associated with each participant of the meeting. This may include generating one or more dashboards based on accessing one or more datastores to assemble the meeting data requested. For example, the virtual digital meeting system 124 may access one or more databases 126, and (or) other data stores associated with third-parties to assemble the information for the dashboard and then generate a graphical representation of the data, such as a pie chart, line graph, bar graph, map, images, and so forth. A user may specify what type of representation is desired for the data, or the virtual digital meeting system 124 may use default display types to generate the graphical representation of the data requested.

Figure 5:
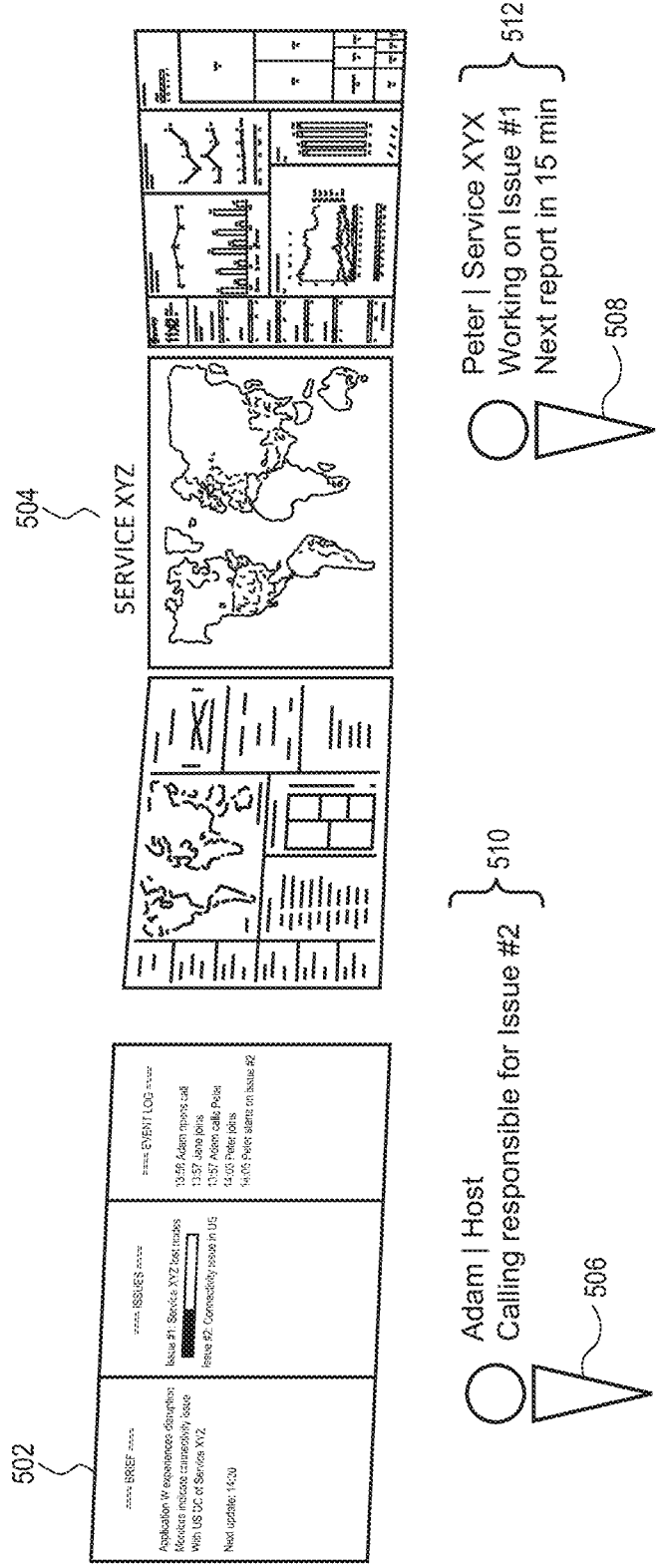
FIGS. 5-10 illustrate an example graphical user interfaces, according to some example embodiments.
Figure 6:
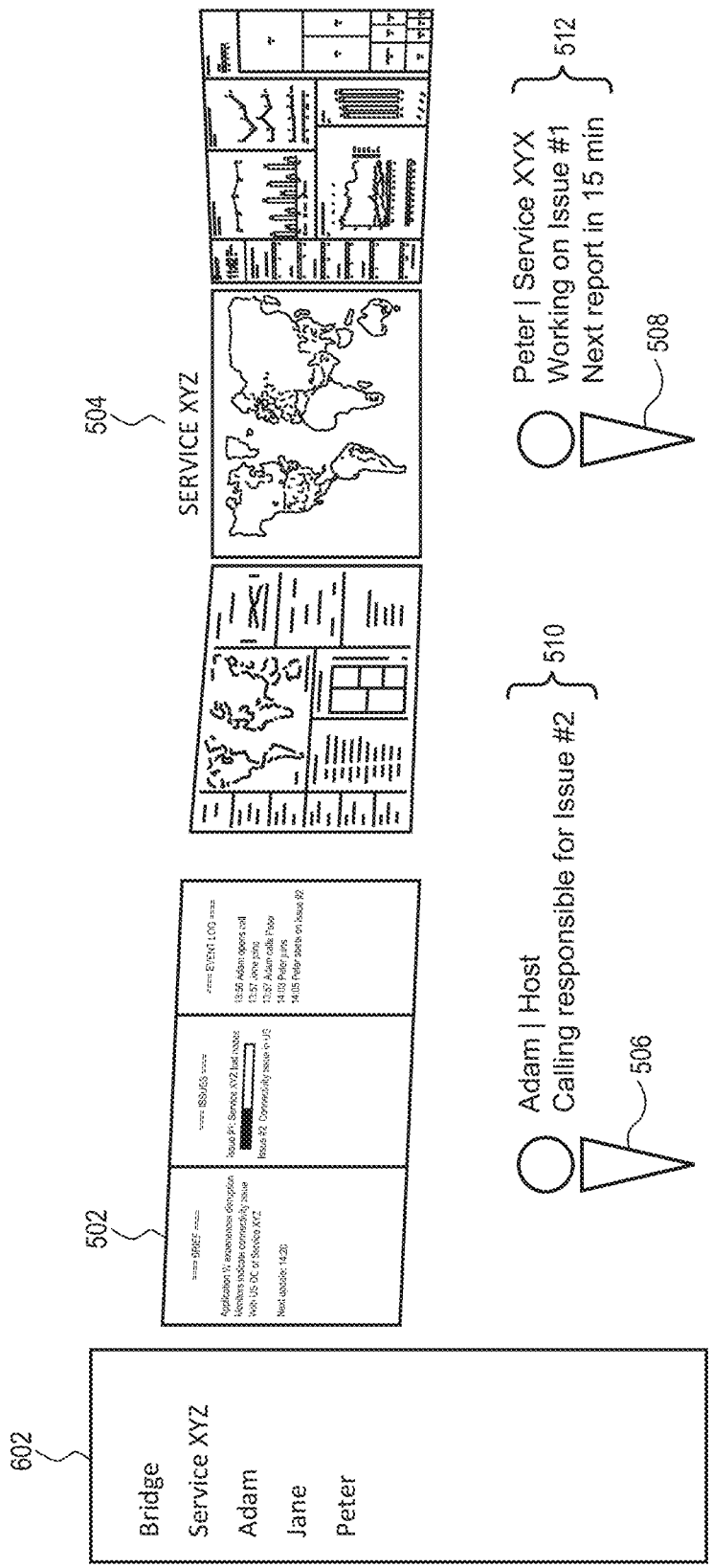

The meeting display may be displayed or visualized to the participants of the meeting in different ways depending on the capabilities of the device they use and the actions and instructions they make. For example, more data may be displayed on a personal computer or large monitor versus a small tablet or smart phone with a smaller display and processing power. The virtual digital meeting system 124 can detect the type of device, display size, and other information of the computing device and generate the display accordingly. FIG. 5 illustrates an example meeting display via a VR display and FIG. 6 illustrates an example meeting display on a monitor of a desktop personal computer. FIG. 5 shows a meeting display comprising information 502 about the virtual digital meeting (e.g., brief or summary of the meeting, issues to address or being addressed in the meeting, an event log), dashboards 504 associated with service XYZ, participant indicators 506 and 508, information 510 and 512 about each participant, and FIG. 6 also includes a list of participants 602.

Figure 7:
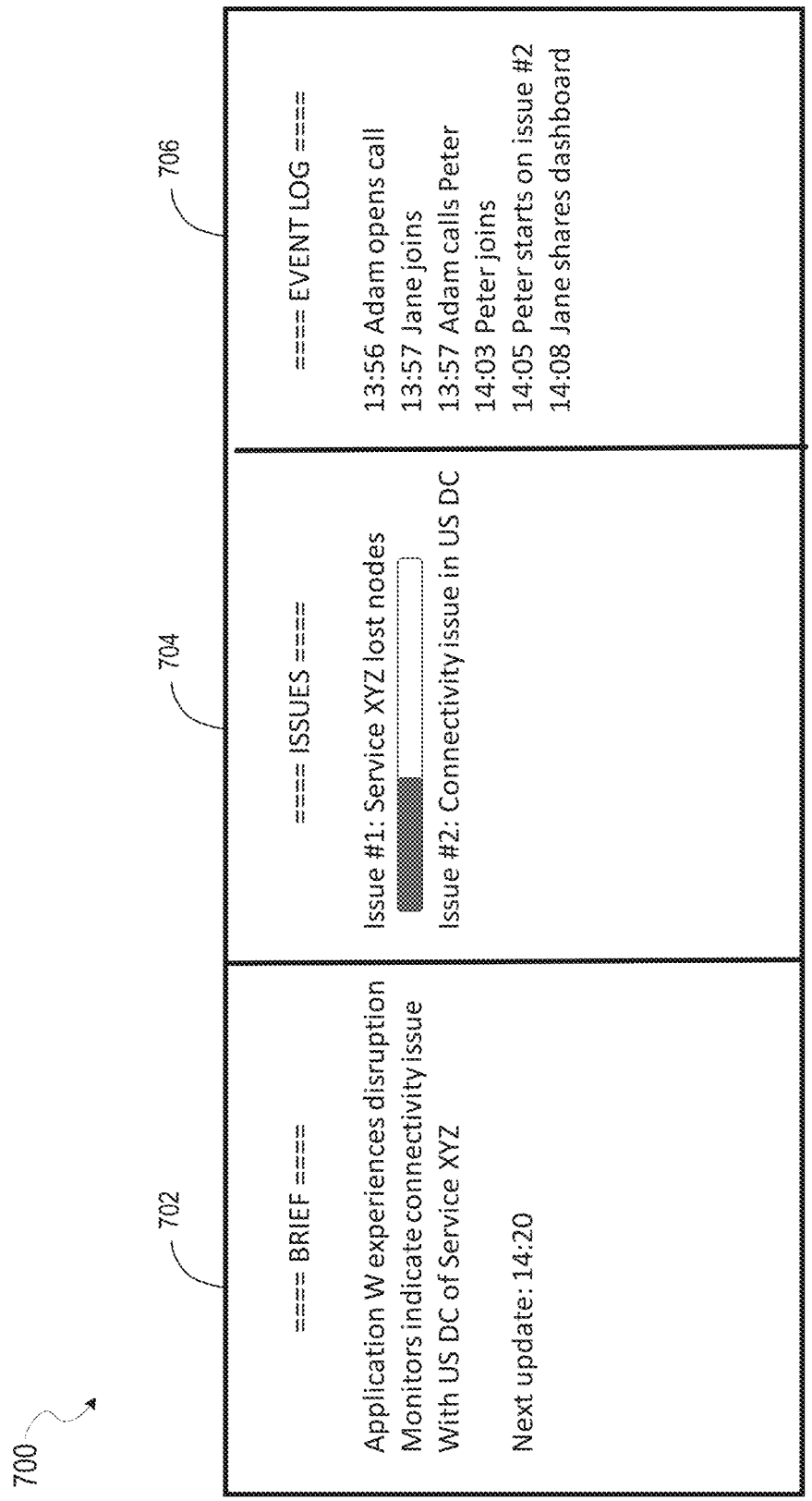

The virtual digital meeting system 124 may provide the ability for each computing device to interact in the virtual digital meeting via the meeting display. The virtual digital meeting system 124 may generate events based on each computing device's interaction with the meeting display and any interactions between one or more computing devices via the meeting display, as shown in operation 310 of FIG. 3. In one example, the virtual digital meeting system 124 causes the events to be displayed as part of the meeting display on each computing device associated with each participant for the meeting. The virtual digital meeting system 124 may cause the events to be displayed in real time or near real time to when the events occur. The events may be stored as part of an event log and displayed in the meeting display as shown in FIGS. 5 and 6 as part of display item 502, or as shown in further detail in the display item 700 of FIG. 7. The example display item 700 in FIG. 7 comprises an example of a display item that may be displayed in the meeting display. The display item 700 may comprise a brief description 702 of the meeting, a list of issues and status of issues 704 for the meeting, and an event log 706 for the meeting.

In one example, the virtual digital meeting system 124 detects a communication between one or more computing devices via meeting display, as shown in operation 312 of FIG. 3. The virtual digital meeting system 124 may cause an indication of the communication between the one or more computing devices to be displayed as part of the meeting display, and generate a graphical user interface item (e.g., another display item) to enable other computing devices to join the communication between the one or more computing devices, separately from the meeting display, as shown in operation 314.

Figure 8:
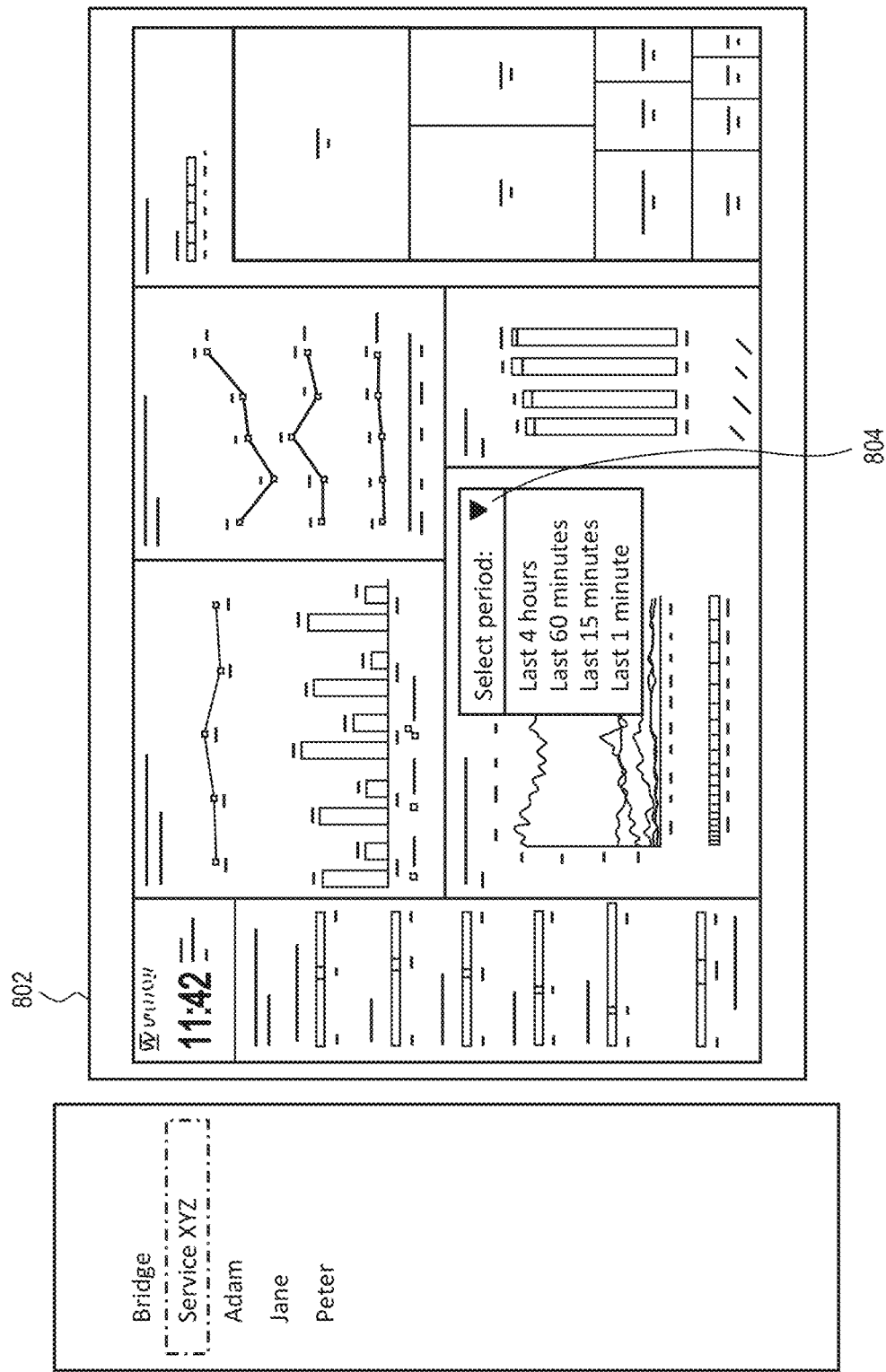

For example, the virtual digital meeting system 124 may receive an indication from a first computing device displaying the meeting display to access further detail associated with a dashboard displayed in the meeting display. FIG. 8 shows an example dashboard 802 displayed on a computing device. A participant may interact with the dashboard 802 to request more detail, a different perspective, and the like. In FIG. 8 the user may interact (e.g., using a touch display, mouse or related device, voice activated commands, and so forth) with the display to select a different period of time for a particular portion of data using a drop-down menu 804, in this example. In response to the indication or request to access further detail, the virtual digital meeting system 124 generates the further detail associated with the dashboard, as explained above. The virtual digital meeting system 124 may assemble the further detail into a second dashboard and cause the dashboard to be displayed on the first computing device but not in the meeting display that is displayed on each computing device associated with each participant for the meeting. In this way, an individual participant may privately interact with the meeting display and be able to request and view additional data or detail without having it be displayed in the virtual digital meeting.

The participant viewing the second dashboard may desire to share the second dashboard with a subset of the other participants. For example, the participant may wish to share the second dashboard with only a second participant. The virtual digital meeting system 124 may receive a request from the first computing device to display the second dashboard on the second computing device displaying the meeting display. The virtual digital meeting system 124 then generates the further detail associated with the at least one dashboard based on accessing one or more datastores to assemble the further detail into a second dashboard for the second computing device, and causes the second dashboard to display on the second computing device but not on the meeting display that is displayed on each computing device associated with each participant in the meeting. In one example, the virtual digital meeting system 124 may cause an indication of the interaction of the first computing device and the second computing device associated with the second dashboard to be displayed in the meeting display so that other participants may view the data that is being shared between the participants or that participants are communicating. The virtual digital meeting system 124 may also update the event log associated with the meeting to include the interaction of the first computing device and the second computing device as an event.

Figure 9:
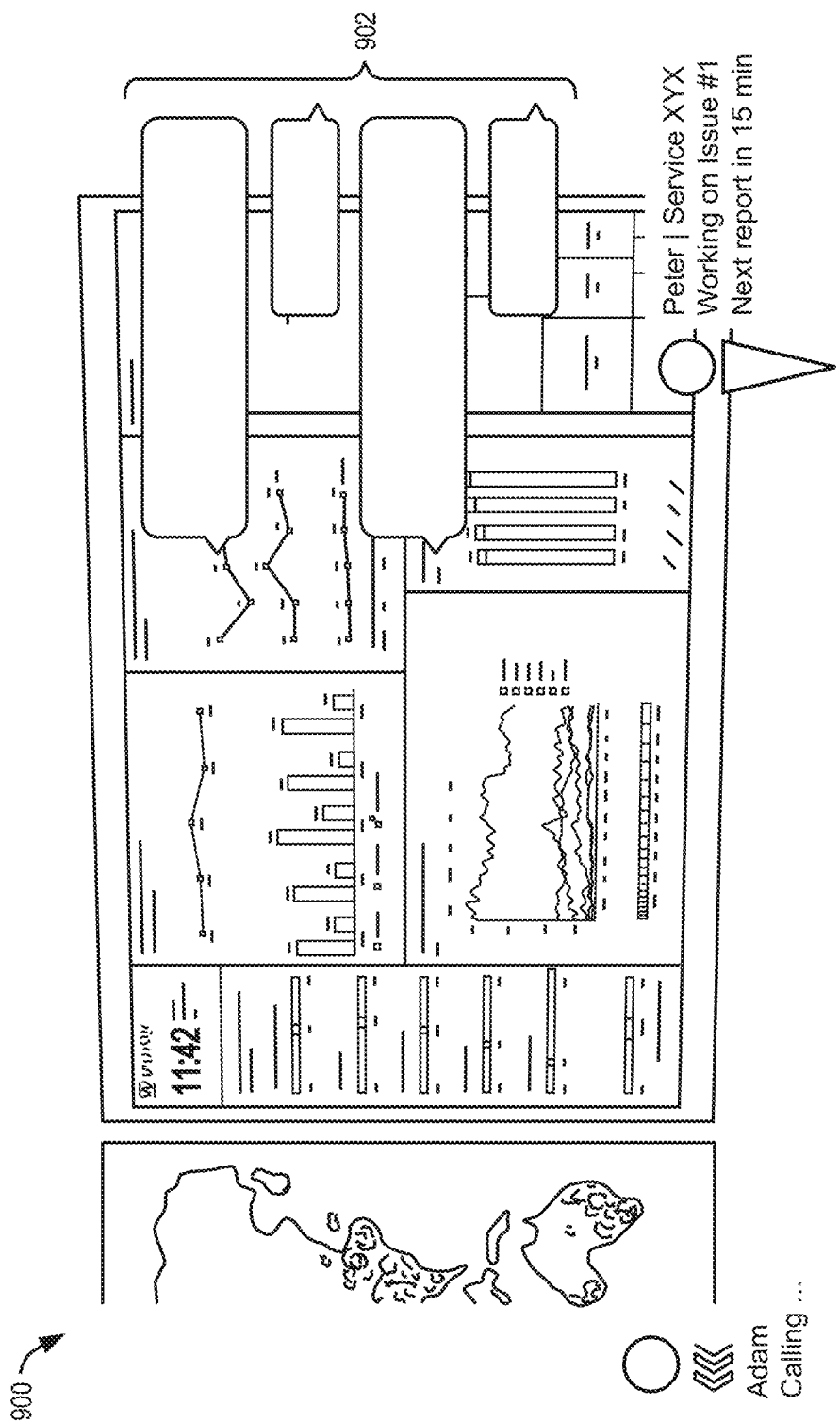
Figure 10:
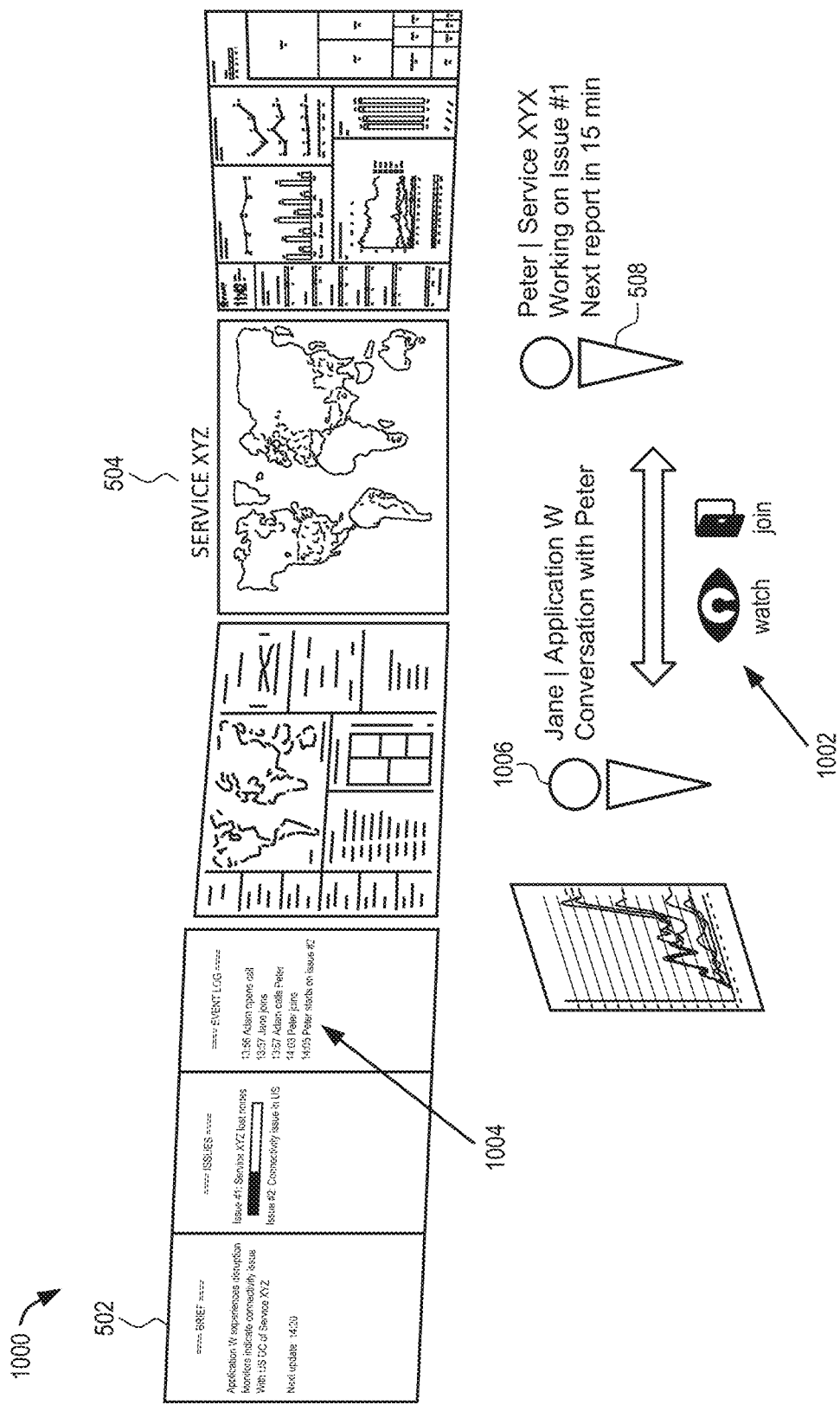

In one example, the first participant may want to further communicate with the second participant about the second dashboard or irrespective of any shared dashboard. The first participant may initiate the communication via the meeting display, as shown in the meeting display 900 of FIG. 9. The virtual digital meeting system 124 may receive a request to communicate with a second computing device participating in the meeting. The virtual digital meeting system 124 initiates communication between the first computing device and the second computing device, for example by using any communication means such as text, voice, and the like exchanged over a network. In one example the first participant and second participant may chat via text messages in a display item 902 that is only displayed on the first computing device and the second computing device, and not on any other computing devices viewing the meeting display. The example meeting display 1000 shown in FIG. 10 illustrates how a display item 1002 may be shown on a display of the first computing device and the second computing device for communications between participants.

The virtual digital meeting system 124 may cause an indication of the communication between the first computing device and the second computing device to be displayed in the meeting display so that other participants can be aware of the communication or join the communication if desired. FIG. 10 shows an example indication 1002 that a first participant 1006 (Jane) is communicating with a second participant 508 (Peter) and a display item to allow others to watch the conversation or join the conversation.

The first participant or the second participant may desire to share the second dashboard (or other data or communication) in the meeting display that is displayed on each computing device associated with each participant for the meeting. The participant wishing to share the second dashboard may interact with the meeting display to request the second dashboard be shared. The virtual digital meeting system 124 receives the request to display the second dashboard in the meeting display that is displayed on each computing device associated with each participant for the meeting and causes the second dashboard to displayed in the meeting display on each computing device associated with each participant for the meeting. The virtual digital meeting system 124 may update the event log associated with the meeting to include the event of displaying the second dashboard and cause the update to the event log to be displayed on the meeting display.

Example embodiments allow for merging of virtual digital meetings. For example, a first virtual digital meeting may be initiated about a first issue and a second virtual digital meeting may be initiated about a second issue. One or more participants may realize that the issues are actually related or dependent upon each other (or one upon another). A participant may request that the first virtual digital meeting be merged with the second virtual digital meeting via the meeting display in either virtual digital meeting. The virtual digital meeting system 124 may receive a request to merge a second meeting with the first meeting, update the first meeting profile with information from a second meeting profile, generate an updated meeting display to further add an indicator for each participant for the second meeting and at least a third dashboard from the second meeting, and cause the updated meeting display to be displayed on each computing device associated with each participant for the meeting.

The following examples describe various embodiments of methods, machine-readable media, and systems (e.g., machines, devices, or other apparatus) discussed herein.

Example 1

A computer-implemented method comprising:
receiving, by a server computer via a network, a request to initiate a new meeting;
generating, by the server computer, a new meeting profile comprising a list of participants for the meeting, meeting data requested for at least a first dashboard, and an event log for the meeting identifying events occurring during the meeting;
generating, by the server computer, a meeting display comprising an indicator for each participant for the meeting, the first dashboard, and the event log;
causing, by the server computer and via the network, the meeting display to be displayed on each computing device associated with each participant for the meeting;
generating, by the server computer, events based on each computing device interaction with the meeting display and interactions between one or more computing devices via the meeting display;
causing, by the server computer via the network, events to be displayed as part of the meeting display on each computing device associated with each participant for the meeting;
detecting, by the server computer, communication between one or more computing devices via the meeting display;
causing, by the server computer, an indication of the communication between the one or more computing devices to be displayed as part of the meeting display; and
generating a graphical user interface item on the meeting display to enable other computing devices to join the communication between the one or more computing devices separately from the meeting display.

Example 2

A method according to Example 1, further comprising generating a participant profile for each participant including at least one of a group comprising: participant name, participant location, participant title, participant role in meeting, action items or events associated with the participant, an organization associated with the participant, avatar representing the participant, an image representing the participant, and progress on actions or events associated with the participant.

Example 3

A method according to any of the previous examples, wherein an event includes at least one of a group comprising: communication between one or more computing devices, action items identified in the meeting, updated status of action items, a new or modified dashboard, and a status update or project update.

Example 4

A method according to any of the previous examples, further comprising:
receiving an indication from a first computing device displaying the meeting display to access further detail associated with the first dashboard;
generating the further detail associated with the first dashboard based on accessing one or more datastores to assemble the further detail into a second dashboard;
causing the second dashboard to be displayed on the first computing device but not on the meeting display that is displayed on each computing device associated with each participant for the meeting.

Example 5

A method according to any of the previous examples, further comprising:
receiving, from the first computing device, a request to display the second dashboard on a second computing device displaying the meeting display;
generating the further detail associated with the first dashboard based on accessing one or more datastores to assemble the further detail into the second dashboard for the second computing device;
causing the second dashboard to display on the second computing device, but not on the meeting display that is displayed on each computing device associated with each participant for the meeting;
causing an indication of an interaction of the first computing device and the second computing device associated with the second dashboard to be displayed in the meeting display.

Example 6

A method according to any of the previous examples, further comprising:
updating the event log associated with the meeting to include the interaction of the first computing device and the second computing device.

Example 7

A method according to any of the previous examples, further comprising:
receiving, from the first computing device, a request to display the second dashboard in the meeting display that is displayed on each computing device associated with each participant for the meeting;
causing the second dashboard to be displayed in the meeting display on each computing device associated with each participant for the meeting;
updating the event log associated with the meeting to include the event of displaying the second dashboard; and
causing the update to the event log to be displayed on the meeting display.

Example 8

A method according to any of the previous examples, further comprising:
receiving, from the first computing device, a request to communicate with a second computing device participating in the meeting;
initiating communication between the first computing device and the second computing device; and
cause an indication of the communication between the first computing device and the second computing device to be displayed in the meeting display.

Example 9

A method according to any of the previous examples, wherein the meeting is a first meeting, the new meeting profile is a first meeting profile, and the method further comprises:
receiving a request to merge a second meeting with the first meeting;
updating the first meeting profile with information from a second meeting profile;
generating an updated meeting display to further add an indicator for each participant for the second meeting and at least a third dashboard from the second meeting; and
causing the updated meeting display to be displayed on each computing device associated with each participant for the meeting.

Example 10

A server computer comprising:
a memory that stores instructions; and
one or more processors configured by the instructions to perform operations comprising:
  receiving a request to initiate a new meeting;
  generating a new meeting profile comprising a list of participants for the meeting, meeting data requested for at least a first dashboard, and an event log for the meeting identifying events occurring during the meeting;
  generating a meeting display comprising an indicator for each participant for the meeting, the first dashboard, and the event log;
  causing the meeting display to be displayed on each computing device associated with each participant for the meeting;
  generating events based on each computing device interaction with the meeting display and interactions between one or more computing devices via the meeting display;
  causing events to be displayed as part of the meeting display on each computing device associated with each participant for the meeting;
  detecting communication between one or more computing devices via the meeting display;
  causing an indication of the communication between the one or more computing devices to be displayed as part of the meeting display; and
  generating a graphical user interface item on the meeting display to enable other computing devices to join the communication between the one or more computing devices separately from the meeting display.

Example 11

A server computer according to any of the previous examples, further comprising generating a participant profile for each participant including at least one of a group comprising: participant name, participant location, participant title, participant role in meeting, action items or events associated with the participant, an organization associated with the participant, avatar representing the participant, an image representing the participant, and progress on actions or events associated with the participant.

Example 12

A server computer according to any of the previous examples, wherein an event includes at least one of a group comprising: communication between one or more computing devices, action items identified in the meeting, updated status of action items, a new or modified dashboard, and a status update or project update.

Example 13

A server computer according to any of the previous examples, further comprising:
receiving an indication from a first computing device displaying the meeting display to access further detail associated with the first dashboard;
generating the further detail associated with the first dashboard based on accessing one or more datastores to assemble the further detail into a second dashboard; and
causing the second dashboard to be displayed on the first computing device but not on the meeting display that is displayed on each computing device associated with each participant for the meeting.

Example 14

A server computer according to any of the previous examples, further comprising:
receiving, from the first computing device, a request to display the second dashboard on a second computing device displaying the meeting display;
generating the further detail associated with the first dashboard based on accessing one or more datastores to assemble the further detail into a second dashboard for the second computing device;
causing the second dashboard to display on the second computing device, but not on the meeting display that is displayed on each computing device associated with each participant for the meeting; and
causing an indication of an interaction of the first computing device and the second computing device associated with the second dashboard to be displayed in the meeting display.

Example 15

A server computer according to any of the previous examples, further comprising:
updating the event log associated with the meeting to include the interaction of the first computing device and the second computing device.

Example 16

A server computer according to any of the previous examples, further comprising:
receiving, from the first computing device, a request to display the second dashboard in the meeting display that is displayed on each computing device associated with each participant for the meeting;
causing the second dashboard to be displayed in the meeting display on each computing device associated with each participant for the meeting;
updating the event log associated with the meeting to include the event of displaying the second dashboard; and
causing the update to the event log to be displayed on the meeting display.

Example 17

A server computer according to any of the previous examples, further comprising:
receiving, from the first computing device, a request to communicate with a second computing device participating in the meeting;
initiating communication between the first computing device and the second computing device; and
causing an indication of the communication between the first computing device and the second computing device to be displayed in the meeting display.

Example 18

A server computer according to any of the previous examples, wherein the meeting is a first meeting and the method further comprises:
receiving a request to merge a second meeting with the first meeting;
updating the first meeting profile with information from a second meeting profile;
generating an updated meeting display to further add an indicator for each participant for the second meeting and at least a third dashboard from the second meeting; and
causing the updated meeting display to be displayed on each computing device associated with each participant for the meeting.

Example 19

A non-transitory computer-readable medium comprising instructions stored thereon that are executable by at least one processor to cause a computing device to perform operations comprising:
receiving a request to initiate a new meeting;
generating a new meeting profile comprising a list of participants for the meeting, meeting data requested for at least a first dashboard, and an event log for the meeting identifying events occurring during the meeting;
generating a meeting display comprising an indicator for each participant for the meeting, the first dashboard, and the event log;
causing the meeting display to be displayed on each computing device associated with each participant for the meeting;
generating events based on each computing device interaction with the meeting display and interactions between one or more computing devices via the meeting display;
causing events to be displayed as part of the meeting display on each computing device associated with each participant for the meeting;
detecting communication between one or more computing devices via the meeting display;
causing an indication of the communication between the one or more computing devices to be displayed as part of the meeting display; and
generating a graphical user interface item on the meeting display to enable other computing devices to join the communication between the one or more computing devices separately from the meeting display.

Example 20

A non-transitory computer-readable medium according to any of the previous examples, further comprising:
receiving an indication from a first computing device displaying the meeting display to access further detail associated with the first dashboard;
generating the further detail associated with the first dashboard based on accessing one or more datastores to assemble the further detail into a second dashboard; and
causing the second dashboard to be displayed on the first computing device but not on the meeting display that is displayed on each computing device associated with each participant for the meeting.

Figure 11:
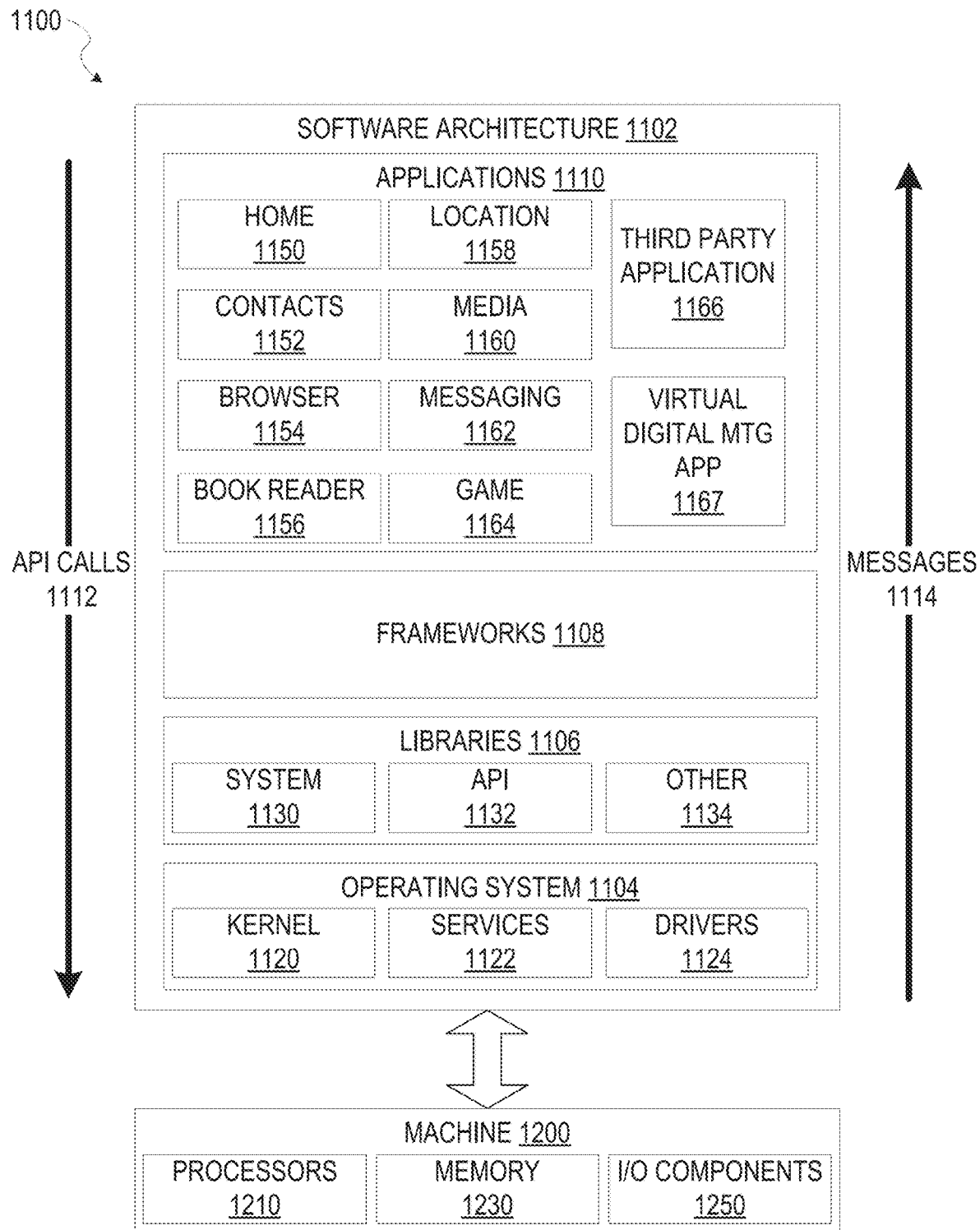
FIG. 11 is a block diagram illustrating an example of a software architecture that may be installed on a machine, according to some example embodiments.

FIG. 11 is a block diagram 1100 illustrating software architecture 1102, which can be installed on any one or more of the devices described above. For example, in various embodiments, client devices 110 and servers and systems 130, 102, 120, 122, and 124 may be implemented using some or all of the elements of software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as machine 1200 of FIG. 12 that includes processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Some embodiments may particularly include a virtual digital meeting application 1167. In certain embodiments, this may be a stand-alone application that operates to manage communications with a server system such as third-party servers 130 or server system 102. In other embodiments, this functionality may be integrated with another application. The virtual digital meeting application 1167 may request and display various data related to a virtual digital meeting and may provide the capability for a user 106 to input data related to the objects via a touch interface, keyboard, or using a camera device of machine 1200, communication with a server system via I/O components 1250, and receipt and storage of object data in memory 1230. Presentation of information and user inputs associated with the information may be managed by virtual digital meeting application 1167 using different frameworks 1108, library 1106 elements, or operating system 1104 elements operating on a machine 1200.

Figure 12:
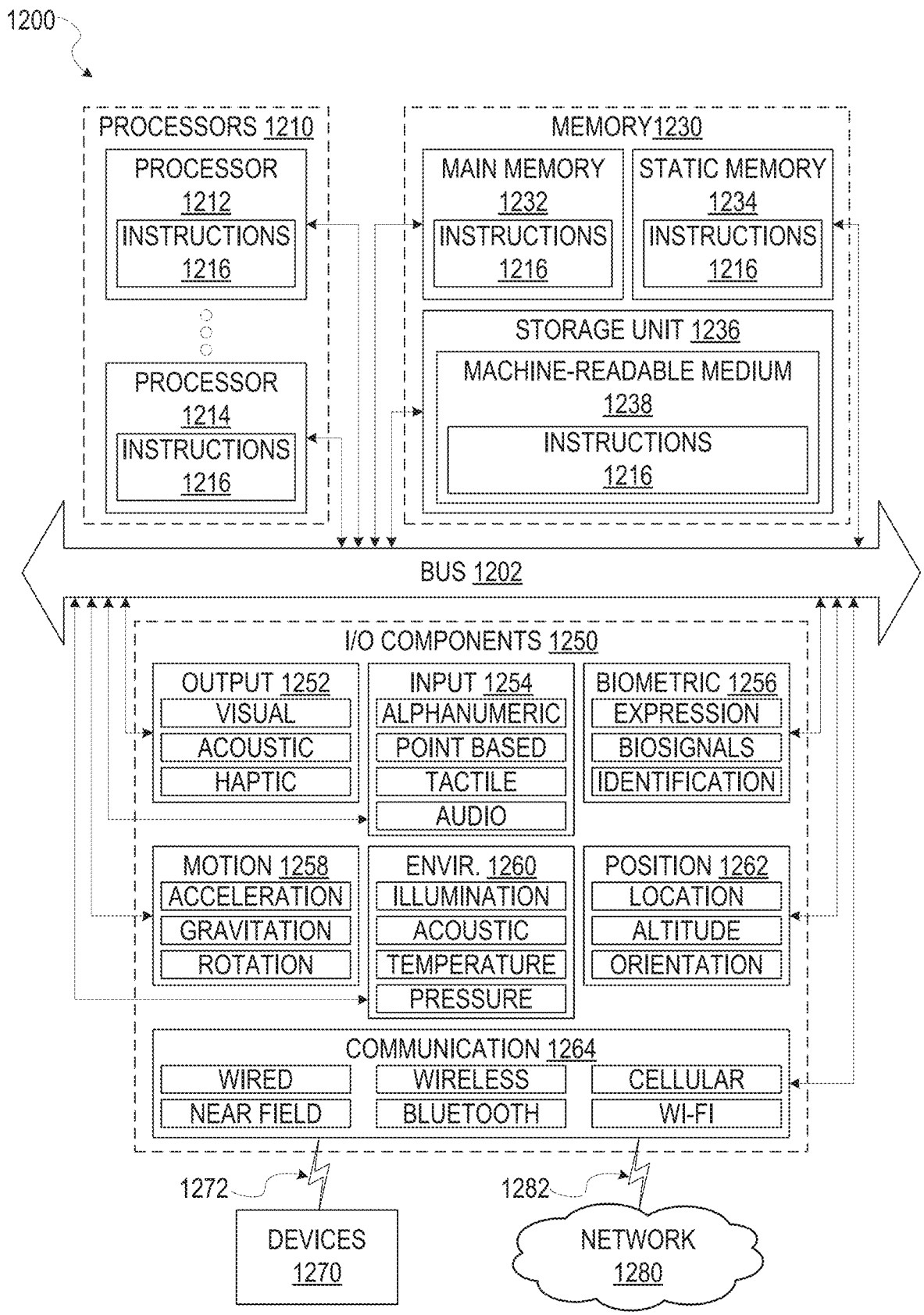
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine 130, 102, 120, 122, 124, etc., or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium 1238 should be considered as being transportable from one physical location to another. Additionally, since the machine-readable medium 1238 is tangible, the medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by a server computer via a network, a request to initiate a new meeting;
   generating, by the server computer, a new meeting profile comprising a list of participants for the meeting, meeting data requested for a dashboard, and an event log for the meeting identifying events occurring during the meeting;
   generating, by the server computer, the dashboard by performing operations comprising:
      accessing one or more datastores to assemble meeting data requested for the dashboard; and
      generating a graphical representation of the assembled meeting data, the graphical representation comprising one or more of a chart, graph, or map based on a participant-specified type of representation;
   generating, by the server computer, a meeting display comprising an indicator for each participant for the meeting, the dashboard comprising the graphical representation of the assembled meeting data comprising one or more of a chart, graph, or map, and the event log;
   detecting, by the server computer, a type of computing device and display size for each participant in the list of participants;
   causing, by the server computer and via the network, the meeting display to be displayed on each computing device associated with each participant for the meeting based on detected capabilities of each computing device, wherein the meeting display is visualized differently on at least two computing devices based on the detected type of computing device and display size for each participant in the list of participants;
   generating, by the server computer, events based on each computing device interaction with the meeting display and interactions between one or more computing devices via the meeting display;
   storing, by the server computer, the events as part of the event log;
   causing, by the server computer via the network, events to be displayed as part of the meeting display on each computing device associated with each participant for the meeting;
   receiving a request, from a first computing device displaying the meeting display, to access further detail associated with the dashboard displayed in the meeting display;
   in response to the request to access further detail associated with the dashboard displayed in the meeting display, assembling the further detail into a second dashboard and causing the second dashboard to be displayed on the first computing device but not in the meeting display that is displayed on each other computing device associated with each participant of the meeting;
   receiving, from the first computing device, a request to display the second dashboard on a second computing device displaying the meeting display; and
   in response to the request to display the second dashboard on a second computing device displaying the meeting display, assembling the further detail into a second dashboard for the second computing device and causing the second dashboard for the second computing device to be displayed on the second computing device but not in the meeting display that is displayed on each other computing device associated with each participant of the meeting; and
   updating the event log to include the interaction of the first computing device and the second computing, device as an event.

2. The method of claim 1, further comprising generating a participant profile for each participant including a participant name, participant title, an action item or event associated with the participant and at least one of a group comprising: participant location, participant role in meeting, an organization associated with the participant, an avatar representing the participant, an image representing the participant, and progress on an action or event associated with the participant.

3. The method of claim 1, wherein an event includes updated status of action items identified in the meeting and at least one of a group comprising: communication between one or more computing devices, action items identified in the meeting, a new or modified dashboard, and a status update or project update.

4. The method of claim 1, further comprising:
   causing an indication of an interaction of the first computing device and the second computing device associated with the second dashboard to be displayed in the meeting display.

5. The method of claim 1, further comprising:
   receiving, from the first computing device; a request to display the second dashboard in the meeting display that is displayed on each computing device associated with each participant for the meeting;
   causing the second dashboard to be displayed in the meeting display on each computing device associated with each participant for the meeting;
   updating the event log associated with the meeting to include the event of displaying the second dashboard; and causing the update to the event log to be displayed on the meeting display.

6. The method of claim 1, further comprising:
receiving, from the first computing device, a request to communicate with the second computing device participating in the meeting;
initiating communication between the first computing device and the second computing device; and
cause an indication of the communication between the first computing device and the second computing device to be displayed in the meeting display.

7. The method of claim 1, wherein the meeting is a first meeting; the new meeting profile is a first meeting profile, and the method further comprises:
receiving a request to merge a second meeting with the first meeting;
updating the first meeting profile with information from a second meeting profile;
generating an updated meeting display to further add an indicator for each participant for the second meeting and at least a third dashboard from the second meeting; and
causing the updated meeting display to be displayed on each computing device associated with each participant for the meeting.

8. The computer-implemented method of claim 6, further comprising:
detecting communication between one or more computing devices via the meeting display;
causing an indication of the communication between the one or more computing devices to be displayed as part of the meeting display; and
generating a graphical user interface item on the meeting display to enable other computing devices to join the communication between the one or more computing devices separately from the meeting display.

9. The computer-implemented method of claim 1, wherein the meeting display is visualized on one computing device of the at least two computing devices with less information than the information of the meeting display that is visualized by another computing device of the at least two computing devices.

10. A server computer comprising:
a memory that stores instructions; and
one or more processors configured by the instructions to perform operations comprising:
receiving a request to initiate a new meeting;
generating a new meeting profile comprising a list of participants for the meeting, meeting data requested for a dashboard; and an event log for the meeting identifying events occurring during the meeting;
generating the dashboard by performing operations comprising:
accessing one or more datastores to assemble meeting data requested for the dashboard; and
generating a graphical representation of the assembled meeting data, the graphical representation comprising one or more of a chart, graph, or map based on a participant-specified type of representation;
generating a meeting display comprising an indicator for each participant for the meeting, the dashboard comprising the graphical representation of the assembled meeting data comprising one or more of a chart, graph, or map, and the event log;
detecting a type of computing device and display size for each participant in the list of participants;
causing the meeting display to be displayed on each computing device associated with each participant for the meeting based on detected capabilities of each computing device, wherein the meeting display is visualized differently on at least two computing devices based on the detected type of computing device and display size for each participant in the list of participants;
generating events based on each computing device interaction with the meeting display and interactions between one or more computing devices via the meeting display;
storing the events as part of the event log;
causing events to be displayed as part of the meeting display on each computing device associated with each participant for the meeting;
receiving a request, from a first computing device displaying the meeting display, to access further detail associated with the dashboard displayed in the meeting display;
in response to the request to access further detail associated with the dashboard displayed in the meeting display, assembling the further detail into a second dashboard and causing the second dashboard to be displayed on the first computing device but not in the meeting display that is displayed on each other computing device associated with each participant of the meeting;
receiving, from the first computing device, a request to display the second dashboard on a second computing device displaying the meeting display; and
in response to the request to display the second dashboard on a second computing device displaying the meeting display, assembling the further detail into a second dashboard for the second computing device and causing the second dashboard for the second computing device to be displayed on the second computing device but not in the meeting display that is displayed on each other computing device associated with each participant of the meeting; and
updating the event log to include the interaction of the first computing device and the second computing device as an event.

11. The server computer of claim 10, further comprising generating a participant profile for each participant including a participant name, participant title, an action item or event associated with the participant and at least one of a group comprising: participant location, participant role in meeting, an organization associated with the participant, an avatar representing the participant, an image representing the participant, and progress on an action or event associated with the participant.

12. The server computer of claim 10, wherein an event includes updated status of action items identified in the meeting and at least one of a group comprising:
communication between one or more computing devices, action items identified in the meeting, a new or modified dashboard, and a status update or project update.

13. The server computer of claim 10, further comprising:
causing an indication of an interaction of the first computing device and the second computing device associated with the second dashboard to be displayed in the meeting display.

14. The server computer of claim 10, further comprising:
receiving, from the first computing device, a request to display the second dashboard in the meeting display that is displayed on each computing device associated with each participant for the meeting;

causing the second dashboard to be displayed in the meeting display on each computing device associated with each participant for the meeting;

updating the event log associated with the meeting to include the event of displaying the second dashboard; and causing the update to the event log to be displayed on the meeting display.

15. The server computer of claim 10, further comprising:

receiving, from the first computing device, a request to communicate with the second computing device participating in the meeting;

initiating communication between the first computing device and the second computing device; and causing an indication of the communication between the first computing device and the second computing device to be displayed in the meeting display.

16. The server computer of claim 10, wherein the meeting is a first meeting and the method further comprises:

receiving a request to merge a second meeting with the first meeting;

updating the first meeting profile with information from a second meeting profile;

generating an updated meeting display to further add an indicator for each participant for the second meeting and at least a third dashboard from the second meeting; and causing the updated meeting display to be displayed on each computing device associated with each participant for the meeting.

17. The server computer of claim 10, the operations further comprising:

detecting communication between one or more computing devices via the meeting display;

causing an indication of the communication between the one or more computing devices to be displayed as part of the meeting display; and generating a graphical user interface item on the meeting display to enable other computing devices to join the communication between the one or more computing devices separately from the meeting display.

18. The server computer of claim 10, wherein the meeting display is visualized on one computing device of the at least two computing devices with less information than the information of the meeting display that is visualized by another computing device of the at least two computing devices.

19. A non-transitory computer-readable medium comprising instructions stored thereon that are executable by at least one processor to cause a computing device to perform operations comprising:

receiving a request to initiate a new meeting;

generating a new meeting profile comprising a list of participants for the meeting, meeting data requested for a dashboard; and an event log for the meeting identifying events occurring during the meeting;

generating the dashboard by performing operations comprising:

accessing one or more datastores to assemble meeting data requested for the dashboard; and generating a graphical representation of the assembled meeting data, the graphical representation comprising one or more of a chart, graph, or map based on a participant-specified type of representation;

generating a meeting display comprising an indicator for each participant for the meeting, the dashboard comprising the graphical representation of the assembled meeting data comprising one or more of a chart, graph, or map, and the event log;

detecting a type of computing device and display size for each participant in the list of participants;

causing the meeting display to be displayed on each computing device associated with each participant for the meeting based on detected capabilities of each computing device, wherein the meeting display is visualized differently on at least two computing devices based on the detected type of computing device and display size for each participant in the list of participants;

generating events based on each computing device interaction with the meeting display and interactions between one or more computing devices via the meeting display;

storing the events as part of the event log;

causing events to be displayed as part of the meeting display on each computing device associated with each participant for the meeting;

receiving a request, from a first computing device displaying the meeting display, to access further detail associated with the dashboard displayed in the meeting display;

in response to the request to access further detail associated with the dashboard displayed in the meeting display, assembling the further detail into a second dashboard and causing the second dashboard to be displayed on the first computing device but not in the meeting display that is displayed on each other computing device associated with each participant of the meeting;

receiving, from the first computing device, a request to display the second dashboard on a second computing device displaying the meeting display; and in response to the request to display the second dashboard on a second computing device displaying the meeting display, assembling the further detail into a second dashboard for the second computing device and causing the second dashboard for the second computing device to be displayed on the second computing device but not in the meeting display that is displayed on each other computing device associated with each participant of the meeting; and updating the event log to include the interaction of the first computing device and the second computing device as an event.

20. The non-transitory computer-readable medium of claim 19, wherein the meeting display is visualized on one computing device of the at least two computing devices with less information than the information of the meeting display that is visualized by another computing device of the at least two computing devices.

* * * * *